US012739698B2

(12) United States Patent
Munukutla et al.

(10) Patent No.: US 12,739,698 B2
(45) Date of Patent: Sep. 15, 2026

(54) METHODS, DEVICES AND SYSTEMS FOR DYNAMIC LIMITING OF AGGREGATE PACKET SIZE

(71) Applicant: Cypress Semiconductor Corporation, San Jose, CA (US)

(72) Inventors: Sandeep Sarma Munukutla, Bangalore (IN); Suprojit Mukherjee, Nadia (IN); Raghavendra Kencharla, Bangalore (IN); Ayush Sood, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 227 days.

(21) Appl. No.: 18/477,777

(22) Filed: Sep. 29, 2023

(65) Prior Publication Data

US 2025/0113248 A1 Apr. 3, 2025

(51) Int. Cl.
*H04W 28/06* (2009.01)

(52) U.S. Cl.
CPC .................................. *H04W 28/06* (2013.01)

(58) Field of Classification Search
CPC .... H04W 28/06; H04W 84/12; H04L 47/365; H04L 47/25; H04B 17/345
See application file for complete search history.

(56) References Cited

U.S. PATENT DOCUMENTS 9,503,245 B1 * 11/2016 Choi ..................... H04L 5/0028
9,763,244 B1 * 9/2017 Jorgovanovic ...... H04W 28/065
2011/0019721 A1 * 1/2011 Diener .................. H04W 88/02 455/73
2014/0254408 A1 * 9/2014 Shukla .................. H04L 1/0002 370/252
2017/0280460 A1 * 9/2017 Emmanuel ............ H04L 5/0055
2025/0016104 A1 * 1/2025 Meydav .............. H04L 47/2483

* cited by examiner

*Primary Examiner* — Brian J. Gillis
*Assistant Examiner* — Juan C Turriate Gastulo

(57) ABSTRACT

A method can include, by operation of first wireless circuits of a device, establishing a maximize size for aggregated packets received on a wireless medium; in response to second wireless circuits of the device using the medium, determining a received packet rate. In response to the received packet rate falling below a limit, the maximum size for aggregated packets received on the medium can be reduced. In response to at least the medium not being used by the second wireless circuits, the maximum size for aggregated packets received on the medium can be increased. The first wireless circuits can operate according to at least a first standard and the second wireless circuits operate according to at least a second standard. Corresponding devices and systems are also disclosed.

20 Claims, 15 Drawing Sheets

METHODS, DEVICES AND SYSTEMS FOR DYNAMIC LIMITING OF AGGREGATE PACKET SIZE

TECHNICAL FIELD

The present disclosure relates generally to wireless systems that include packet aggregation, and more particularly to systems that receive aggregated packets on a wireless medium that is shared with collocated circuits and/or can experience interference.

BACKGROUND

Packet aggregation in wireless systems, such as IEEE 802.11 wireless systems (WLAN), can improve data transfer efficiency by including multiple data units (e.g., payload data units) in a single transmission. Conventional combination wireless devices are known that include a WLAN radio and a Bluetooth (BT) radio that share a 2.4 GHz band. A wireless medium can be shared between the two radios using time division multiplexing (TDM). However, in such combination devices, a WLAN radio can abruptly handover the medium to the BT radio, causing failures in reception, such when receiving large packets, such as aggregated packets. Such failures can result in the transmitting device misinterpreting the channel conditions as being bad, and adopting a lower transmission rate in the next re-transmission attempt. This can further degrade throughput.

One way to address such reception failures can be to lower packet aggregation size. Smaller aggregate packet size can result in fewer reception failures in the receive window presented by combination devices. As a result, conventional systems can adopt a fixed, maximum packet aggregation size that is tuned for the wireless devices in use (i.e., tuned to the type of access point). A drawback to such an approach can be that a maximum packet aggregate size for a system of one manufacturer may not be optimal for another system from another manufacturer.

Any improvements in the performance of wireless systems that use packet aggregation would be highly desirable, particularly for systems with combination devices that include multiple radios sharing a same medium.

SUMMARY OF DISCLOSURE

Embodiments can include, by operation of first wireless circuits of a device, establishing a maximize size for aggregated packets received on a wireless medium. In response to second wireless circuits using the medium, a determination can be made regarding received packet rate. In response to the received packet rate falling below a limit, a maximum size for aggregated packets received on the medium can be reduced. In response to at least the medium not being used by the second wireless circuits, the maximum size for aggregated packets received on the medium can be increased. The first wireless circuits can operate according to at least a first standard and the second wireless circuits can operate according to at least a second standard that is different than the first standard.

DETAILED DESCRIPTION

According to embodiments, a wireless device receiving aggregated packets can monitor use of a medium. If the medium is impacted, due to medium sharing with another radio and/or interference, a maximum packet aggregation size can be reduced. Maximum packet aggregation size can continue to be reduced while packet reception rates are low and/or medium state remains adversely affected. When a packet reception rate and/or medium condition improves, a maximum packet aggregation size can be increased.

In some embodiments, a wireless device can be compatible with one or more IEEE 802.11 wireless standards (referred to herein as WLAN). A station device (STA) can transmit control frames to an access point (AP) to dynamically vary maximum packet aggregation size in response to a medium use by a co-located device and/or medium quality.

In some embodiments, a wireless device can be a combination device, and when a medium is in use by another radio, maximum packet aggregation size can be dynamically lowered.

In some embodiments, a wireless device can be a combination device that includes WLAN circuits the share a 2.4 GHz band with other wireless circuits, including but not limited to Bluetooth (BT) or IEEE 802.15.4 based circuits (e.g., Zigbee).

In some embodiments, a wireless device can be a combination device that executes a closed loop system that selects an optimal packet aggregation size based on any of, co-located radio activity, received packet rate or medium conditions.

Figure 1A:
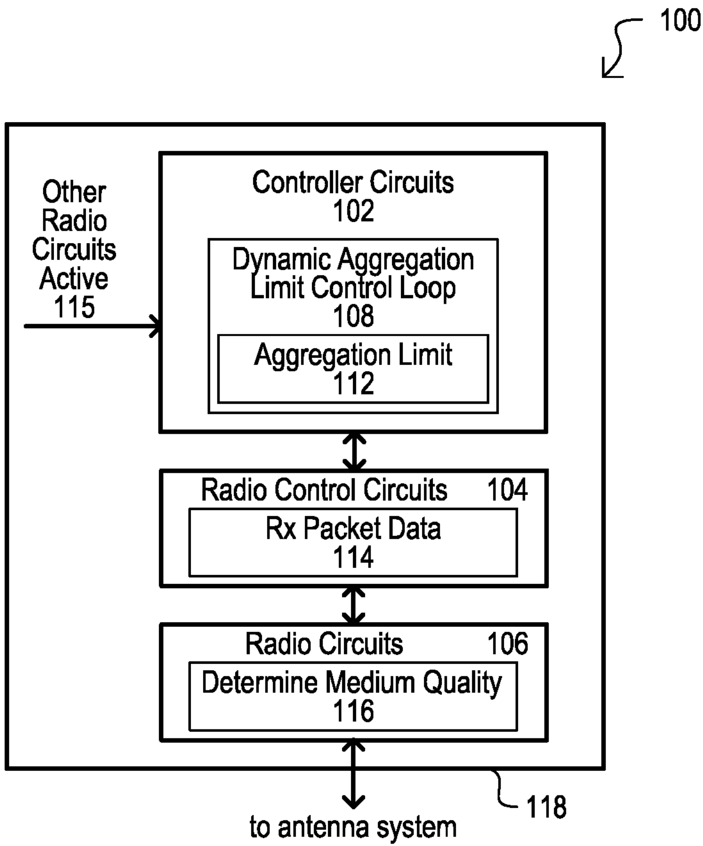
FIG. 1A is a block diagram of a wireless device according to an embodiment.

FIG. 1A is a block diagram of a wireless device 100 according to an embodiment. A device 100 can include controller circuits 102, radio control circuits 104, and radio circuits 106. Controller circuits 102 can include a dynamic aggregation limit control loop 108, which can generate an aggregation limit value 112 for determining a maximum size for received aggregated packets. Control loop 108 can generate an aggregation limit value 112 based on any of: other radio circuit activity 115, a receive packet rate 114 and/or a quality of the medium 116 over which packets are received. Other radio circuit activity 115 can include signals received from other circuits of the same device (not shown) and/or signals received over a wired or wireless connection from another device.

Radio control circuits 104 can control radio operations of a wireless device, including tracking received packets and/or storing or preparing packets for transmission. Radio control circuits 104 can provide data on received packets 114. From such data, control loop 108 can determine a received packet rate.

Radio circuits 106 can receive packets, including aggregated packets, and can transmit packets, including packets that indicate an aggregation size limit. Radio circuits 106 can also provide information on medium quality 116. Such medium quality information 116 can be accessed by a control loop 108. Radio circuits 106 can connect to one or more antenna systems.

In operation, a device 100 can receive aggregated packets at radio circuits 106 with an initial maximum size. Using control loop 108, device 100 can monitor for other radio circuit activity 115 and medium quality 116. If other radio activity 115 is detected or the medium quality 116 is determined to be bad (e.g., below a predetermined quality threshold), control loop 108 can monitor a receive packet rate from receive packet data 114. If a receive packet rate falls (e.g., falls below a predetermined limit, reduces at a predetermined rate), control loop 108 can reduce an aggregation limit value 112. Such a reduced aggregation limit value 112 can result in subsequently received aggregated packets having a smaller maximum size. In this way, a wireless device can include a closed loop system that can adjust a maximum packet aggregation size in response to other radio circuit activity and/or changes in medium quality.

Figure 1B:
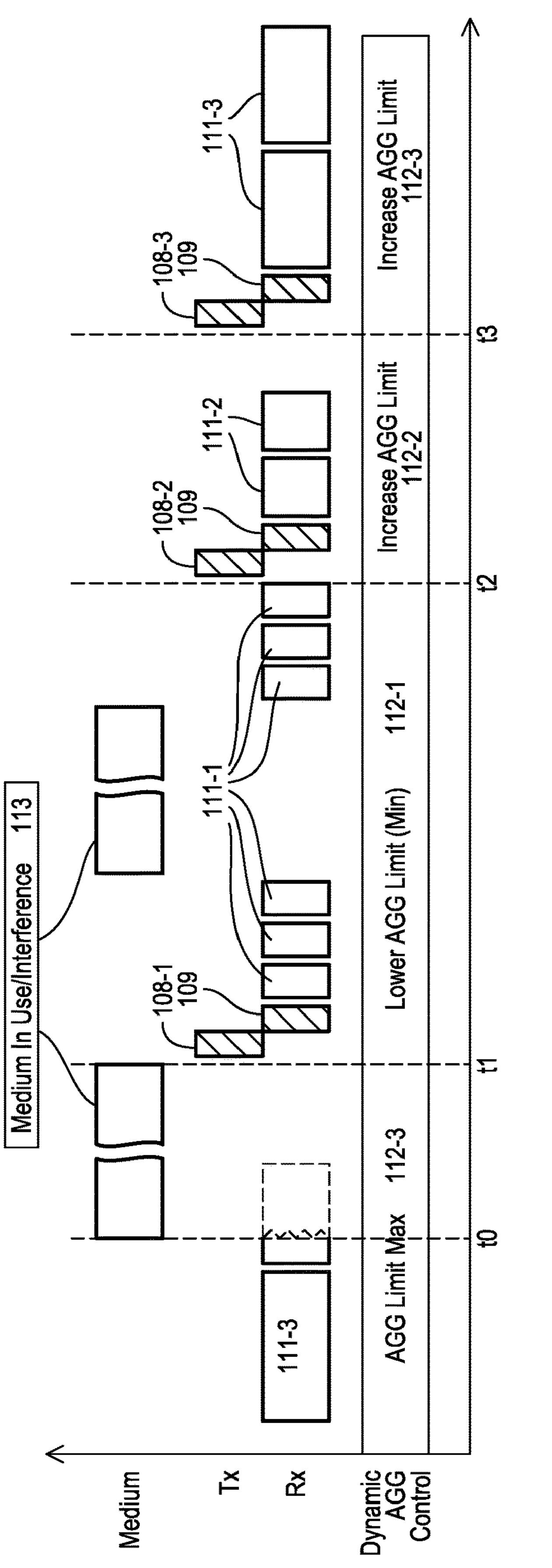
FIG. 1B is a timing diagram showing operations of a wireless device according to an embodiment.

FIG. 1B is a timing diagram showing dynamic packet aggregation size control according to an embodiment. In some embodiments, the operations of FIG. 1B can be executed by a device like that shown in FIG. 1A. FIG. 1B includes waveforms for “Medium”, which can show the status a wireless medium; “Tx” can show packets transmitted from a device; “Rx” can show packets received by a device, including aggregated packets; and “Dynamic AGG Control” can show changes in an aggregation (AGG) limit made by the device.

Prior to time t0, a device can receive packets having a maximum aggregation size 111-3.

At about time t0, a wireless medium status can change. Such a change can include, but is not limited to, the medium being in use by another radio or the medium experiencing interference 113. A medium being in use by another radio can include another radio indicating it will be sharing a medium (e.g., through time division multiplexing, TDM), it will be taking over a medium (e.g., using the medium for a period of time), or it may take over the medium currently or in the future. In response to the change in medium status, a device can monitor packet reception performance (e.g., receive rate).

At about time t1, a device determines that packet reception has been adversely affected by the medium status change. As a result, an aggregation size can be reduced 112-1. In the embodiment shown, a device can transmit a configuration packet 108-1 that can indicate a reduction in packet aggregation size. Such a configuration packet can be acknowledged 109 by a peer device (i.e., a device sending the aggregated packets). Subsequently, aggregated packets 111-1 can have a reduced size. In the embodiment shown, the reduced aggregation size can be a minimum size.

At about time t2, a device determines that a medium is no longer adversely affected by other radio use or interference. As a result, an aggregation size can be increased 112-2. In the embodiment shown, a device can transmit a configuration packet 108-2 that can indicate an increase in packet aggregation size, which can be acknowledged 109 by a peer device. Subsequently, aggregated packets 111-2 can have an increased size.

At about time t3, a device determines that a medium continues to be free. As a result, an aggregation size can be increased further 112-3. In the embodiment shown, a device can transmit a configuration packet 108-3 that is acknowledged 109. Subsequently, aggregated packets 112-3 can have an increased size, which can be a maximum aggregation size.

In this way, in response to adverse changes in a wireless medium, a maximum packet aggregation size can be reduced. As a medium status improves, a packet aggregation size can be increased.

Figure 2:
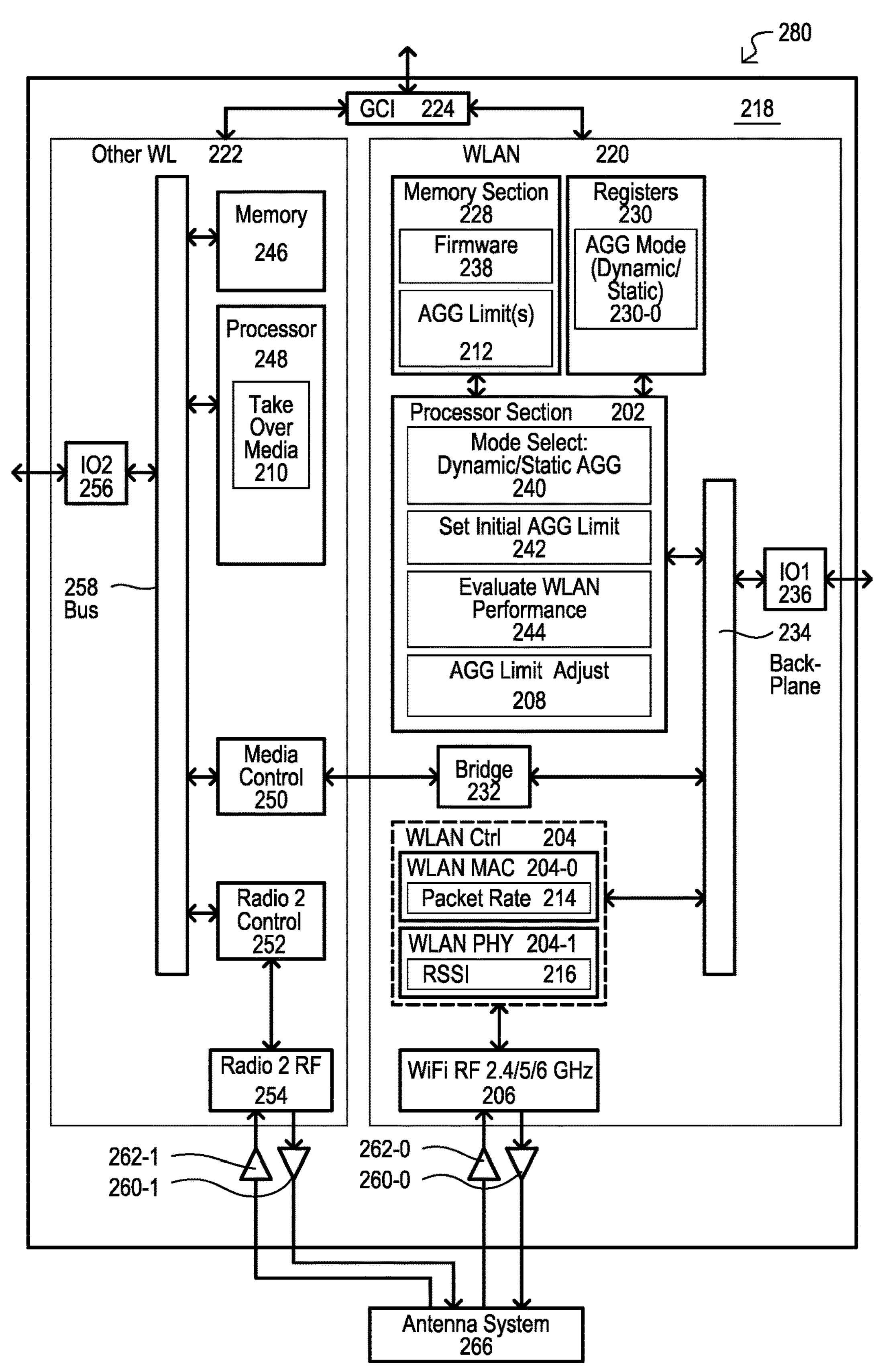
FIG. 2 is a block schematic diagram of a combination device according to an embodiment.

FIG. 2 is a block diagram of a system 280 according to an embodiment. A system 280 can include WLAN circuits 220, other wireless (WL) circuits 222, a coexistence interface (IF) 224, and an antenna system 266. WLAN circuits 220 can include a processor section 202, a memory section 228, configuration registers 230, first input/output (IO) circuits 236, bridge control circuit 232, WLAN control circuits 204, and WLAN RF circuits 206. In the embodiment shown, processor section 202, bridge control circuit 232, WLAN control circuits 204 and first IO circuits 236 can be in communication over a backplane 234.

A processor section 202 can include one or more processors that execute instructions for WLAN operations, including mode select operation 240, set initial AGG limit 242, evaluate WLAN performance 244, and AGG limit adjust 208. Mode select operations 240 can enable WLAN circuits 220 to switch between a first mode, in which an AGG limit can be a fixed value, and a second mode, in which an AGG limit can be dynamically changed in response to device and/or medium conditions. Setting an initial AGG limit 242 can include establishing an initial AGG limit. Such a limit can be selected in any suitable way, including but not limited to, from a value included in a beacon transmission, a minimum aggregation value, a maximum aggregation value or some intermediate value.

Evaluating WLAN performance 244 can be used to determine if an aggregation limit should be increased or decreased. Evaluating WLAN performance can take any suitable form, including but not limited to, determining a packet receive rate, a packet error rate, a bit error rate, a received signal strength indication (RSSI). AGG limit adjust 208 can include dynamically changing packet aggregation size, according to any of the embodiments described herein, or equivalents, including a closed loop system.

A memory section 228 can include memory circuits for storing data accessible by a processor section 202. Such data can include instructions 238 executable by a processor section 202 to provide the noted functions/operations. Such data can also include AGG limit values 212. AGG limit values 212 can include current AGG limit values as well as other AGG limit values (e.g., initial AGG limit values, or vendor specific fixed AGG limit values). Configuration registers 230 can store values for controlling operations of WLAN circuits 220. In the embodiment shown, registers 230 can include an AGG mode register 230-0. According to the value stored in AGG mode register 230-0, a WLAN circuits 220 can operate with fixed AGG limits or execute dynamic changes to AGG limit values, as described herein or equivalents.

First IO circuits 236 can enable communication with the system 280 according to any suitable interface, including a serial interface or parallel interface. In some embodiments, first IO circuits 236 can be compatible with one or more serial standards, including but not limited to: an SPI standard, $I^2C$ standard, USB standard, CAN bus, PCI Express and/or a proprietary standard.

WLAN control circuits 204 can include circuits for performing functions according to one or more IEEE 802.11 wireless standards, including those operating in the 2.4 GHz band, and in some embodiments, the 5 and/or 6 GHz bands. WLAN control circuits 208 can include WLAN media access control (MAC) circuits 204-0 and WLAN physical interface layer (PHY) circuits 204-1. WLAN MAC circuits 204-0 can provide packet rate data 214, including receive packet rate data for use by AGG limit adjust operation 208. WLAN PHY 204-1 can monitor a medium (e.g., channel(s) of the 2.4 GHz band) for non-ideal conditions, including measuring an RSSI 216 of incoming signals. An RSSI 216 can be used by an AGG limit adjust operation 208.

WLAN RF circuits 206 can transmit and receive signals received in channels of the 2.4 GHz band, as well as other bands (e.g., 5 and 6 GHZ). WLAN RF circuits 206 can drive one or more power amplifiers (PAS) 260-0 and receive input signals from on one or more low noise amplifiers (LNAs) 262-0.

Other WL circuits 222 can provide wireless communications according to one or more other (i.e., not WLAN) wireless standards that may share a same band as WLAN circuits 220. In some embodiments, WLAN circuits 220 can operate in at least the 2.4 GHz band, and other WL circuits 222 can operate according to another standard operating in the same band, including but not limited to a BT standard (including BLE) and/or a standard based on the IEEE 802.15.4 standard. Other WL circuits 222 can include a processor section 248, a memory section 246, media control circuits 250, second IO circuits 256 and other radio control circuits 252, all connected to one another by a bus 258.

Processor section 248 can execute instructions for other wireless operations. Such other wireless operations can include a media take over operation 210, that can signal to WLAN circuits 220 that other WL circuits 222 are, or may be, accessing a wireless medium also used by WLAN circuits 220. Such an action can include indicating a duty cycle for TDM access to a same medium. Memory section 246 can store data for executing other wireless operations, including those for processor section 248.

Other radio circuits 254 can be controlled by other radio control circuits 252 and can include radio circuits to enable transmission of messages according to the one or more other WL standards. In the embodiment shown, other radio circuits 254 can drive one or more PAs 260-1 and receive input signals from one or more LNAs 262-1.

Media control circuits 250 can communicate with WLAN circuits 220 via bridge circuits 232 to indicate use or sharing of a shared medium. In some embodiments, such a communication path can be used by AGG limit adjust 208 to determine when a media is being shared.

WLAN circuits 220 and other WL circuits 222 can be in communication with a coexistence interface 224. A coexistence interface 224 can enable WLAN circuits 220 and other WL circuits 222 to interface with other wireless systems, such as cellular network systems, including but not limited to 3G, 4G, LTE and 5G networks. In some embodiments, AGG limit adjust operation 208 can use activity by such other systems to adjust aggregate packet size limits.

In some embodiments, WLAN circuits 220, other WL circuits 222 and coexistence IF 224 can be formed with same semiconductor substrate 218.

In this way, a device can include WLAN circuits and other wireless circuits that can share a same wireless medium. WLAN circuits can dynamically change a receive aggregate packet size in response to access to the shared medium by the other wireless circuits.

To better understand various features of the embodiments described herein, examples of packet aggregation will now be described.

Figure 3A:
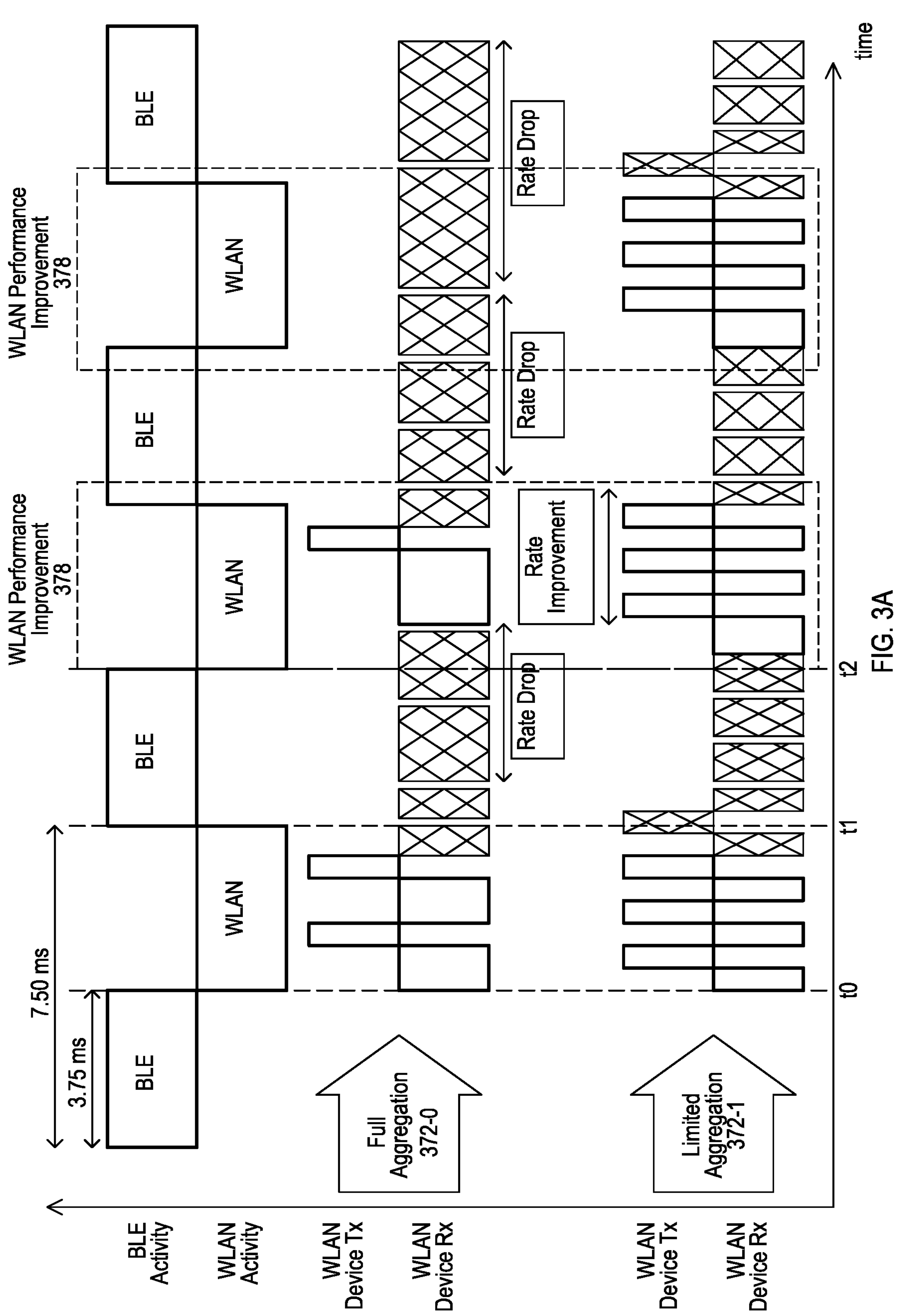
FIG. 3A is a timing diagram comparing conventional operations using packet aggregation.

FIG. 3A is a timing diagram comparing fixed packet aggregation sizes in a combination device that shares a medium between a BT (i.e., BLE) radio and WLAN radio. In FIG. 3A, "BLE Activity" shows when BLE circuits are active on the shared medium. "WLAN Activity" shows when WLAN circuits are active on the shared medium. "WLAN Device Tx" shows WLAN circuit transmissions. "WLAN Device Rx" shows WLAN circuit reception. FIG. 3A shows a case with full aggregation 372-0 (e.g., max aggregation size) and limited aggregation 372-1 (e.g., less than maximum). FIG. 3A shows a TDM arrangement, where BLE and WLAN circuits share the medium over a 7.5 ms cycle, with a 50% duty cycle.

Referring to FIG. 3A, at time t0, in both the full aggregation case 372-0 and limited aggregation case 372-1, WLAN circuits can receive aggregated packets.

At time t1, BLE can take over the medium, resulting in a rate drop.

At time t2, the medium can return for use by WLAN circuits. In the full aggregation case 372-0, packets can be received. However, in the limited aggregation case 372-1 more packet data can be received, resulting in relative packet reception rate improvement 378.

Figure 3B:
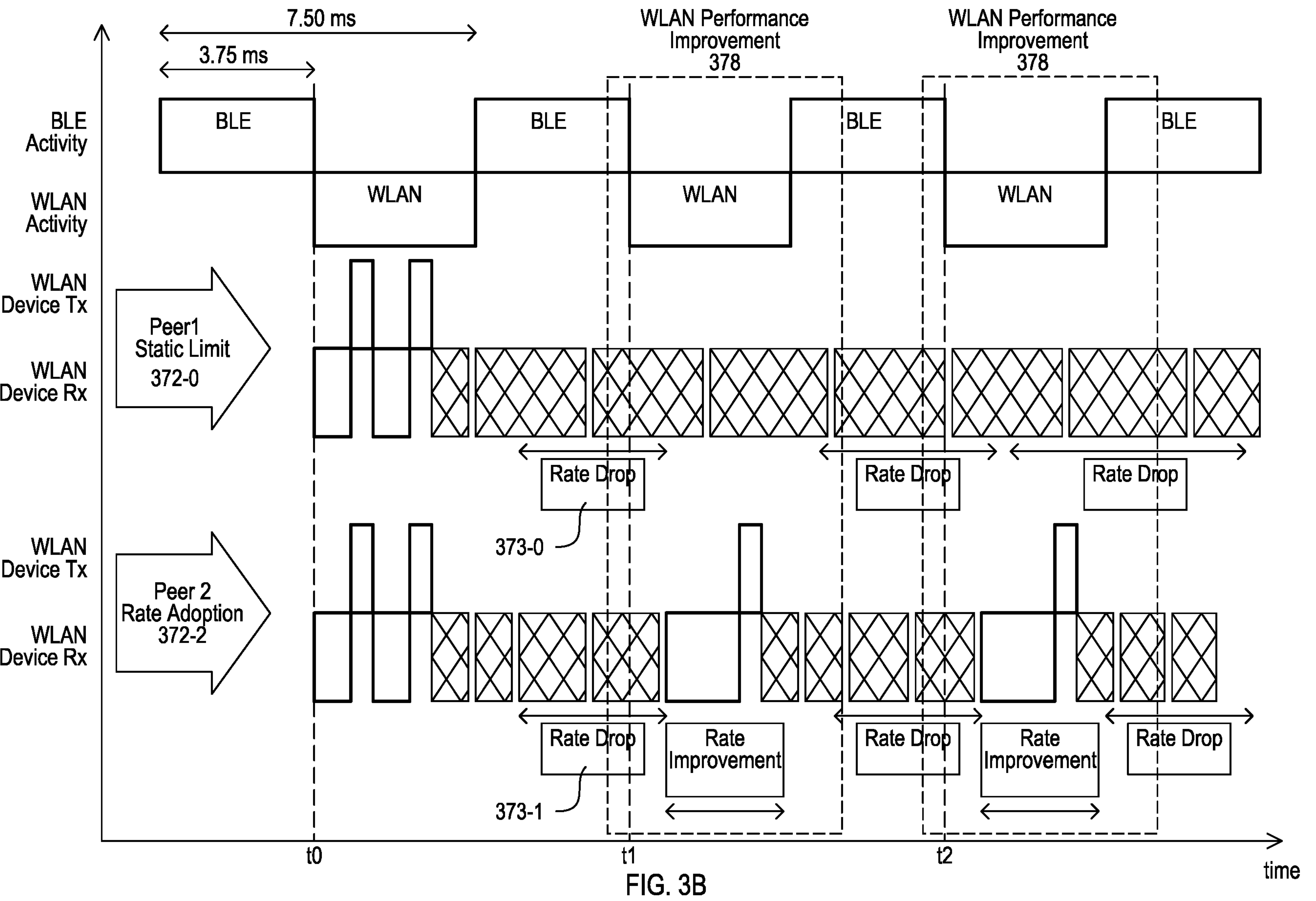
FIG. 3B is another timing diagram comparing conventional operations using packet aggregation.

FIG. 3B is a timing diagram comparing different packet aggregation configurations. FIG. 3B shows the same waveforms as FIG. 3A, but compares responses for a same aggregation configuration for two different peers. In the case of a first peer 372-0, the resulting rate drop 373-0 in subsequent re-transmissions can be greater than the rate drop 373-1 that occurs with the second peer 372-2. Because of this, WLAN aggregate packet reception performance can be significantly worse when associated with a peer whose rate drop is a drastic step down from another peer.

Figure 4:
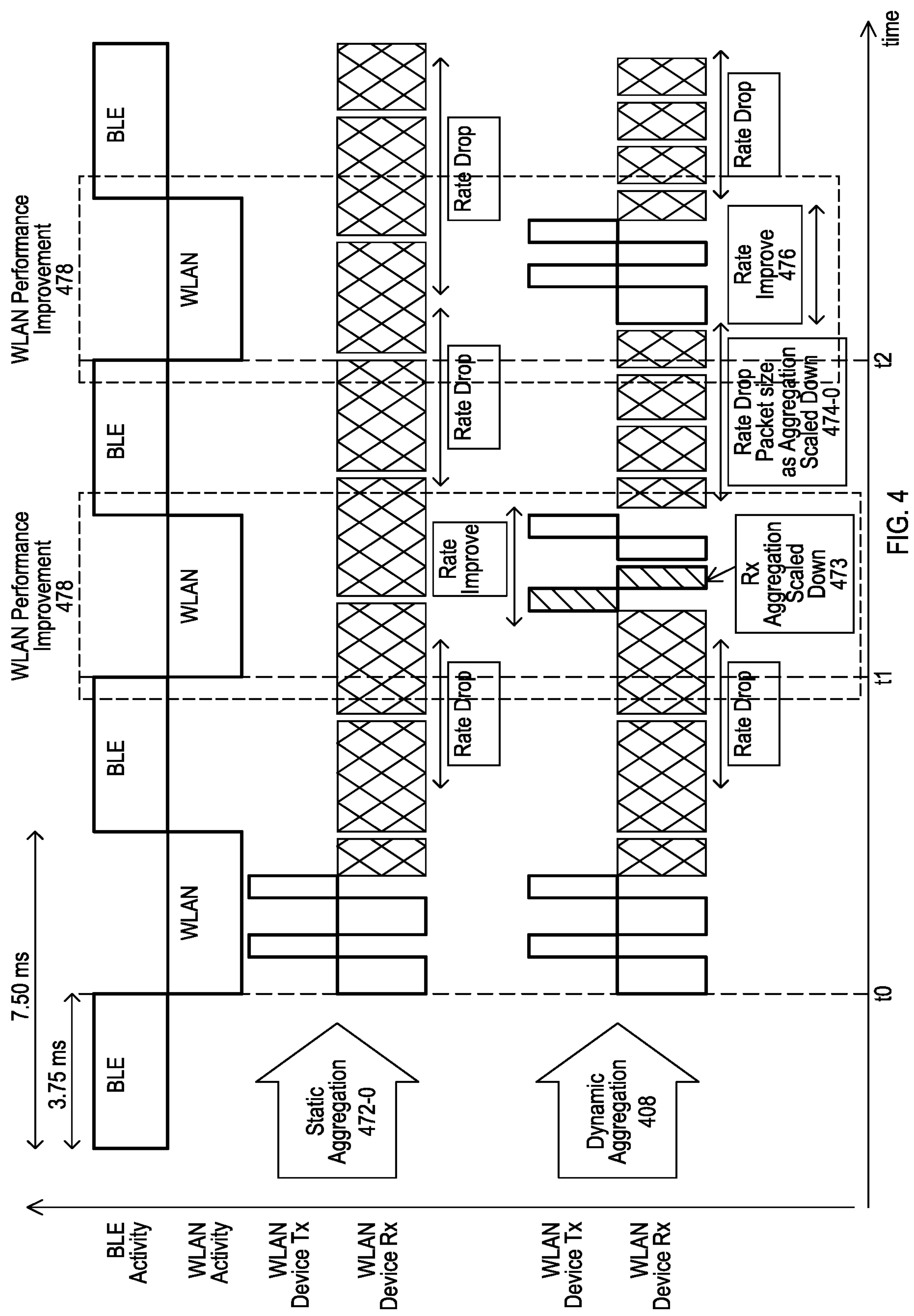
FIG. 4 is a timing diagram comparing conventional packet aggregation to dynamic packet aggregation according to an embodiment.

FIG. 4 is a timing diagram comparing conventional static packet aggregation 472-0 to dynamic packet aggregation 408 according to an embodiment. Static aggregation 472-0 can result in rate drops, as described for the static aggregation case of FIG. 3B.

Dynamic packet aggregation limiting 408 can improve performance over static limits. Referring still to FIG. 4, at about time t0, a device can operate with a same maximum aggregation size as the static case 472-0.

At about time t1, in response to rate drops, the dynamic aggregation case 408 can communicate with a peer (i.e., sending) device, to scale down aggregation 473. Consequently, a maximum size of a received aggregate packet can be smaller.

At about time t2, unlike the static aggregation case 472-0, the dynamic changes to aggregate packet size can result in receive rate improvements 476. It is understood that dynamic aggregation 408 can continue to reduce or increase aggregate packet size as conditions change, tailoring an aggregate packet size to converge on a highest packet receive rate for the operating conditions.

In this way, dynamic packet aggregation can increase receive rate of aggregate packets over systems that use static aggregate packet size limits.

Figure 5:
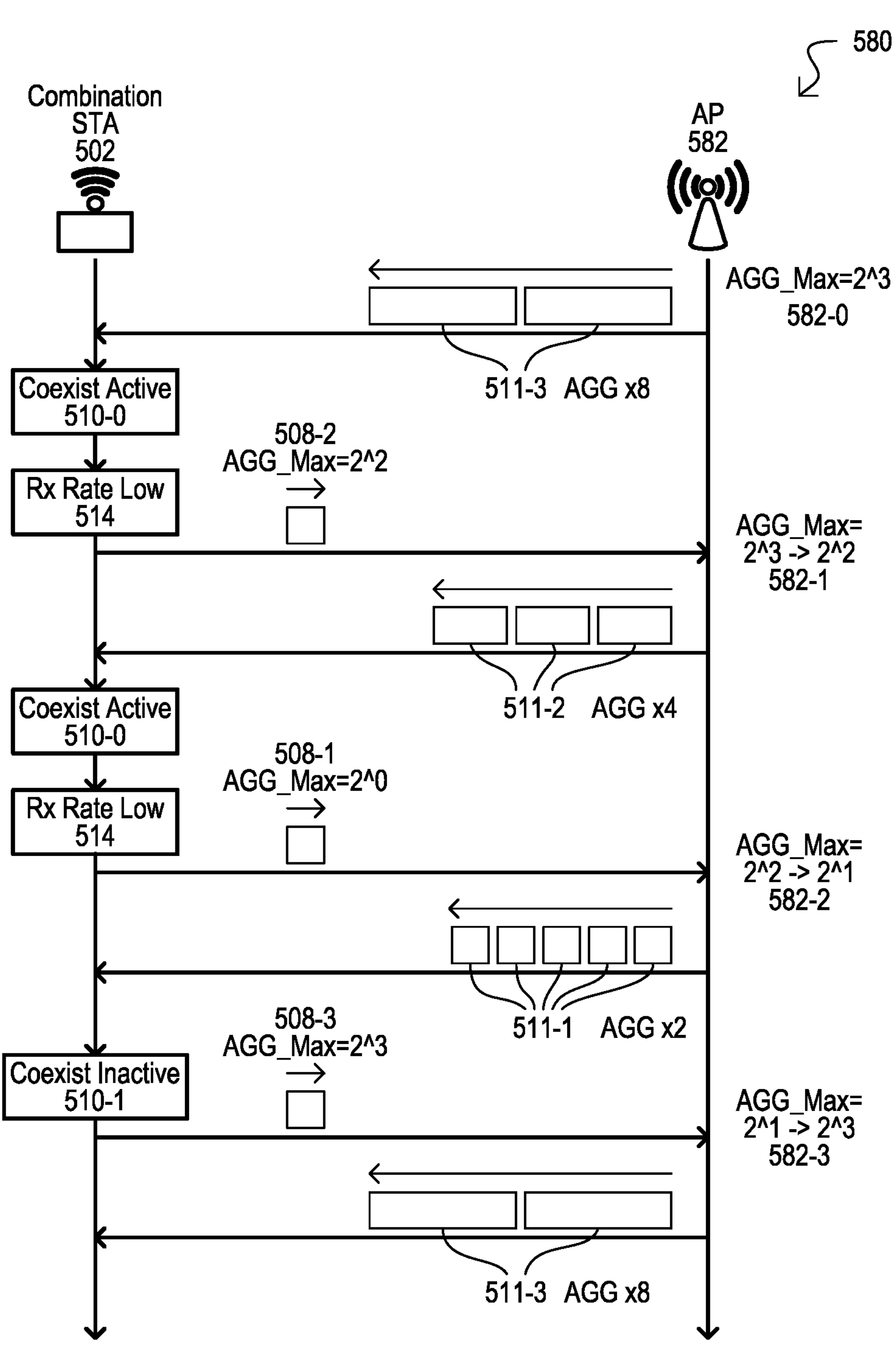
FIG. 5 is signaling diagram showing dynamic packet aggregation in a system according to an embodiment.

FIG. 5 is a signaling diagram of a system 580 according to an embodiment. A system 580 can be a WLAN system that includes an AP 582 and a combination STA 502. A combination STA 502 can be a device having WLAN circuits and another coexisting radio circuit that share the medium used by the system 580.

A system 580 can have an initial maximum aggregate packet size 582-0 (AGG_Max=2ˆ3). Such a value can be established in any suitable manner, including but not limited to, a beacon transmitted by AP 582, or a request transmitted by STA 502. Consequently, AP 582 can transmit aggregate packets having an initial max size (x8) 511-3.

A STA 502 can determine that a coexisting radio is active 510-0 and that a packet receive rate is low 514. A STA 502 can transmit a configuration packet 508-2 that can indicate a reduction in maximum aggregation size. In response to the configuration packet 508-0, AP 582 can reduce a maximum aggregate packet size 582-1 (AGG_Max=2ˆ3→2ˆ2). Thus, transmitted aggregate packets can have a lower max size (×4) 511-2.

A STA 502 can continue to determine that the coexisting radio is active 510-0 and that a packet receive rate is low 514, and so can transmit a configuration packet 508-1 that can indicate a further reduction in maximum aggregation size. In response to the configuration packet 508-1, AP 582 can reduce a maximum aggregate packet size further 582-1 (AGG_Max=2ˆ2→2ˆ1). Thus, transmitted aggregate packets can have an even lower max size (×2) 511-1.

A STA 502 can determine that a coexisting radio is not active 510-1, and so can transmit a configuration packet 508-3 that can indicate an increase in maximum aggregation size. In the embodiment shown, configuration packet 508-3 can indicate a return to an initial aggregate size limit (AGG_Max=2ˆ1→2ˆ3). In response, AP 582 can increase an aggregate packet maximum size (x8) 511-3.

In this way, a combination STA can transmit a configuration packet indicating a reduction in maximum aggregate packet size when a coexisting radio is impacting WLAN performance, and transmit a configuration packet indicating an increase in maximum aggregate packet size when the coexisting radio is no longer impacting WLAN performance.

Figure 6:
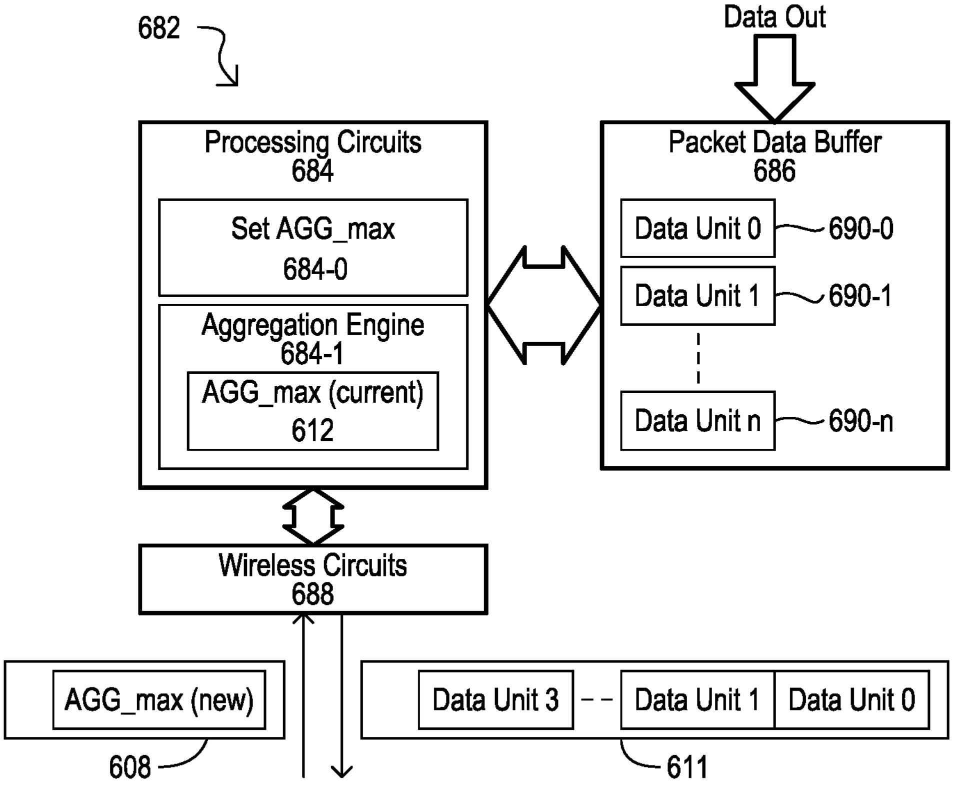
FIG. 6 is a diagram of a peer device that can be included in a system according to embodiments.

FIG. 6 is a block diagram of a peer device 682 that can be included in embodiments. A peer device 682 can receive configuration packets from a wireless device, and change a maximum aggregate packet size in response to such configuration packets. In some embodiments, a peer device 682 can be an AP.

A peer device 682 can include processing circuits 684, packet data buffer 686 and wireless circuits. Processing circuits 684 can execute various operations for communicating with other wireless devices. Such operations can include setting AGG_max 684-0 and an aggregation engine 684-1. Setting AGG_max 684-0 can include, but is not limited to, establishing an initial AGG_max value, and then updating such a value in response to configuration packets received from other devices. Aggregation engine 684-1 can aggregate data units into a single transmission, where the number of data units aggregated can be set by a current AGG_max value 612.

A packet data buffer 686 can receive outgoing data for transmission from peer device 682. Packet data buffer 686 can have data arranged into data units 690-0 to **690-*n*. Data units (690-0 to -n) can be a standard payload size for packets, but can be aggregated to form an aggregated packet. In some embodiments, data units (690-0** to -n) can be protocol data units (PDU) according to a standard, including but not limited to, a WLAN MAC service data unit (MSDU) or MAC protocol data unit (MPDU).

Wireless circuits 688 can receive packets, including control packets 608 having AGG_max values, and transmit packets, including aggregated packets 611 containing multiple data units.

In operation, peer device 682 can transmit aggregated packets to other devices, where such aggregated packets have a size established by an initial AGG_max value. A device receiving aggregated packets can dynamically generate AGG_max values in response to medium conditions, as described herein, and transmit such new AGG_max values in control packets 608. In response to a control packet 608, processing circuits can establish a new AGG_max (operation 684-0). Aggregation engine 684-1 can then create aggregated packets using the new AGG_max.

In this way, a peer device can change aggregate maximum packet sizes in response to control packets generated by another wireless device that dynamically changes maximum aggregate packet sizes in response to medium conditions.

Figure 7A:
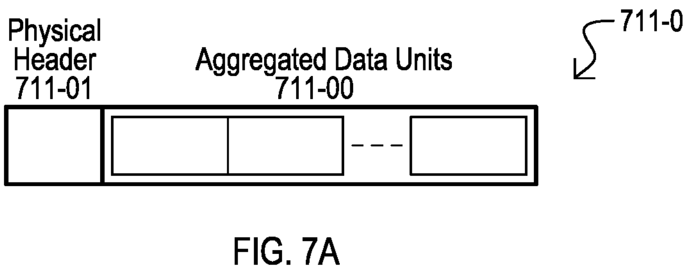
FIGS. 7A to 7C are diagrams showing aggregated packets that can be included in embodiments.
Figure 7B:
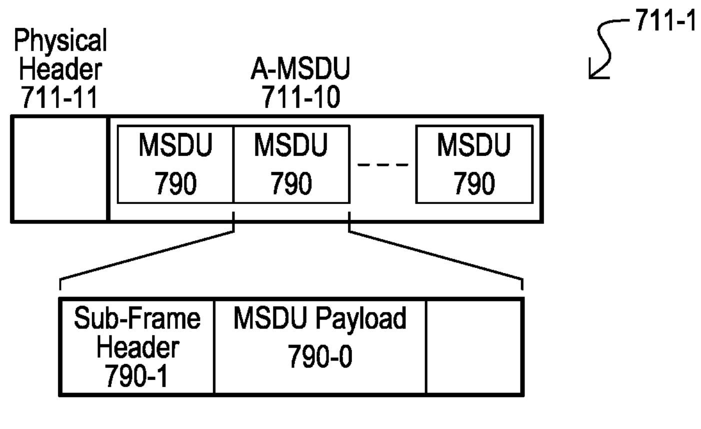
Figure 7C:
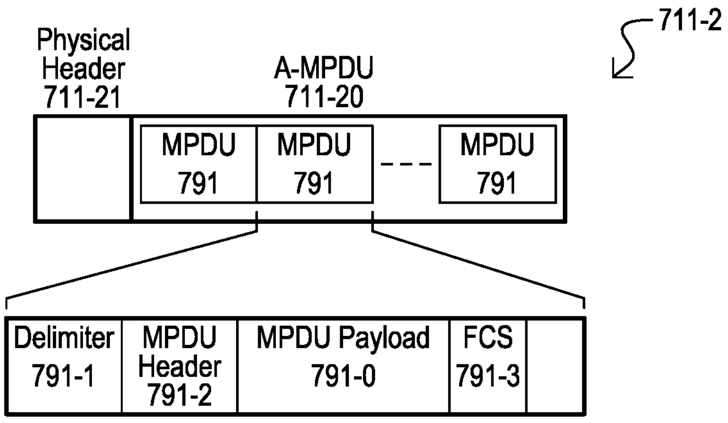

FIGS. 7A to 7C are diagrams of aggregated packets that can be included in embodiments. FIG. 7A shows an aggregated packet 711-0 that can be sent in a single transmission, and that includes aggregated data units 711-00 and a physical header 711-01. A size of aggregated data units 711-00 can dynamically change in response to conditions, as described herein and equivalents.

FIG. 7B shows an aggregate WLAN packet 711-1 that can be included in embodiments. WLAN packet 711-1 can include aggregated MSDUs (A-MSDU) 711-10 and a physical header 711-11. Each MSDU 711-10 can include an MSDU payload 790-0 and a sub-frame header 790-1. A number of MSDUs can dynamically change in response to conditions, as described herein and equivalents.

FIG. 7C shows an aggregate WLAN packet 711-2 that can be included in embodiments. WLAN packet 711-2 can include aggregated MPDUs (A-MPDU) 711-20 and a physical header 711-21. Each MPDU 791 can include a MPDU payload 791-0, delimiter 791-1, MPDU header 791-2, and a frame check sequence (FCS) 791-3. A number of MPDUs can dynamically change in response to conditions, as described herein and equivalents.

In this way, embodiments can dynamically change the size of aggregated packets according to any standard, private or public, including aggregated packets according to WLAN standards.

Figure 7D:
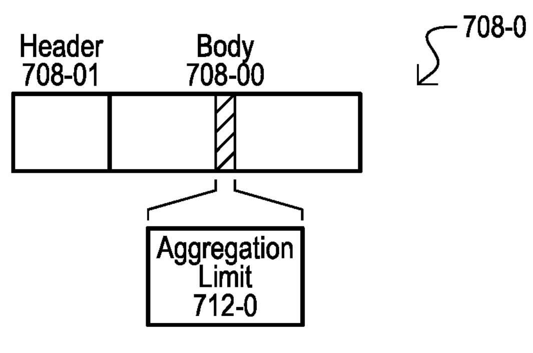
FIGS. 7D and 7E are diagrams of packets for establishing a maximum aggregation size that can be included in embodiments.
Figure 7E:
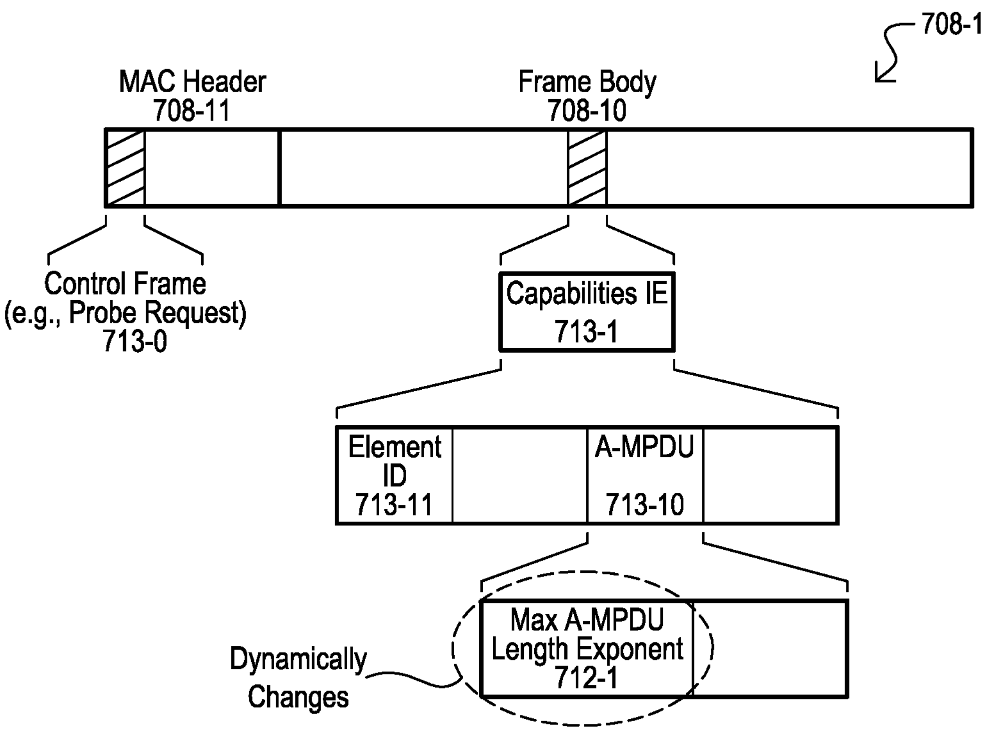

FIGS. 7D and 7E are diagrams of control (or configuration) packets that can be included in embodiments. FIG. 7D shows a control packet 708-0 that includes a body 708-00 and header 708-11. A body 708-00 can include an aggregation limit value. A control packet 708-0 can be a packet compatible with any suitable wireless standard.

FIG. 7E shows a WLAN control packet 708-1 that can be included in embodiments. A WLAN packet 708-1 can include a MAC header 708-11 and frame body 708-10. A MAC header 708-11 can include an identifier field 713-0 indicating the frame body 708-10 includes control information. A frame body 708-10 can include a capabilities information element (IE) 713-1. Capabilities IE 713-1 can include an element ID 713-11, indicating the IE contains aggregation data, and aggregation data 713-10. Aggregation data 713-10 can include a maximum aggregation value 712-1 that can take the form of a length exponent. A length exponent can be a binary exponent value resulting aggregation sizes (x2, ×4, ×8, etc.).

In this way, embodiments can generate control packets with maximum aggregation values according to any standard, private or public, including WLAN standards. Such aggregation values can dynamically change in response to medium conditions.

While embodiments can include the various methods described for systems, devices and operations herein, additional methods will now be described with reference to flow diagrams.

Figure 8:
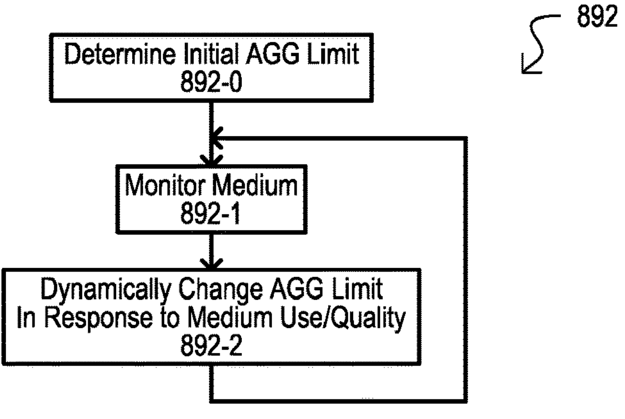
FIG. 8 is a flow diagram of a method according to an embodiment.

FIG. 8 is a flow diagram of a method 892 according to an embodiment. A method 892 can be executed by wireless systems and/or devices. A method 892 can include determining an initial AGG limit 892-0. Such an action can include, but is not limited to, using a default AGG limit (e.g., predetermined limit, maximum AGG limit, minimum AGG limit) or an AGG limit negotiated with one or more other devices. A medium can be monitored 892-1. Such an action can include, but is not limited to, monitoring for activity of a coexisting radio, monitoring for other medium activity, monitoring received packet data (e.g., packet rate, packet error, bit error), or any other suitable method for detecting interference, including adjacent channel interference (ACI).

A method 892 can dynamically change an AGG limit in response to medium quality and/or use 892-2. Such an action can include reducing an AGG limit as a medium quality decreases and/or use increases, and increasing an AGG limit as a medium quality increases and/or use decreases.

In this way, an aggregation limit for wireless packets can be dynamically changed in response to medium conditions.

Figure 9:
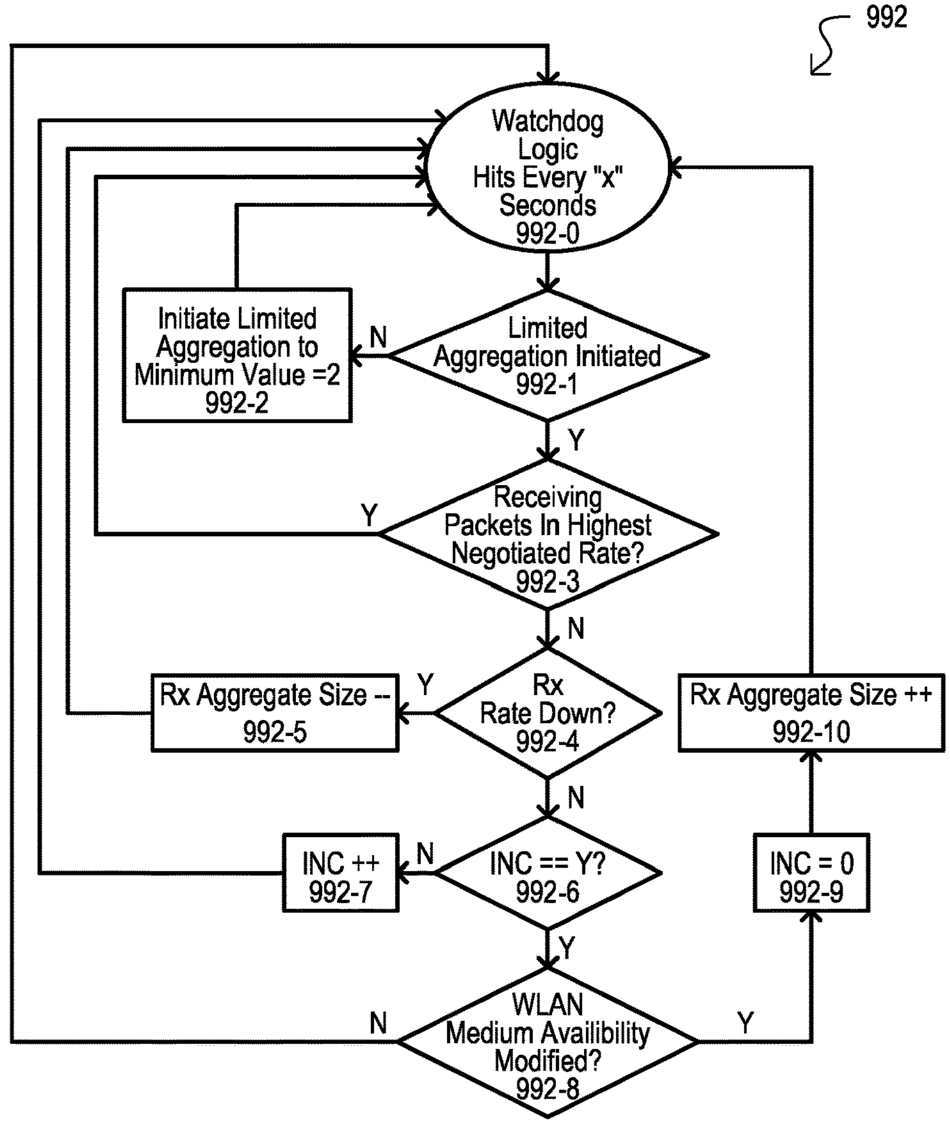
FIG. 9 is a flow diagram of a method according to a further embodiment.

FIG. 9 is flow diagram of a method 992 according to another embodiment. A method 992 can be executed by a WLAN device that receives aggregated packets. A method can include periodically executing a control loop that can adjust an aggregate packet size in response to receive rates and medium availability. In the method 992 shown, this can include executing a watchdog logic periodically (e.g., every "x" seconds) 992-0. A value of "x" can be a constant value, or can vary according to mode or other circumstances.

A method 992 can determine if limited aggregation has been initiated 992-1. If limited aggregation has not been initiated (N from 992-1), a method can initiate limited aggregation, with an aggregation size set to a minimum value 992-2, which in the embodiment shown can be two. In some embodiments, such an action can include a device transmitting a control packet with the minimum aggregation size. A method 992 can then return to the watchdog logic 992-0.

If limited aggregation has already been initiated (Y from 992-1), a method can determine if packets are being received at a highest negotiated rate 992-3. If the highest negotiated rate is being met (Y from 992-3), a method 992 can then return to the watchdog logic 992-0.

If packets are not being received at a highest negotiated rate (N from 992-3), a method can determine if a packet reception rate is down 992-4. Such an action can compare a number of packets received in a current time period to a previous time period. If a receive rate is down (Y from 992-4) an aggregation size can be reduced 992-5. In the embodiment shown, reducing an aggregation size can be an incremental process, reducing an aggregation size from a current value to a next lower value. However, in other embodiments, the amount by which an aggregation size limit is reduced can vary according to the severity of medium conditions (e.g., amount of time a coexisting radio has the medium, amount of interference). In some embodiments, such an action can include a device transmitting a control packet that indicates the smaller aggregate packet size. A method 992 can then return to the watchdog logic 992-0.

If a receive rate is not down (N from 992-4), a method can determine if a loop timing has ended 992-6. In the embodiment shown, this can include determining if a value (INC) has reached a limit (Y). If the monitoring period has not ended (N from 992-6), a method can increment the loop timing value 992-7, and then return to the watchdog logic 992-0.

If a loop timing has ended (Y from 992-6), a method can determine if the WLAN medium availability has been modified 992-8. Such an action can include, but is not limited to, determining if a coexisting radio is no longer using a medium and/or if previously detected interference (e.g., ACI) is no longer present. If medium availability has not been modified (N from 992-8), a method can return to the watchdog logic 992-0.

If medium availability has been modified (Y from 992-8), a method can reset the loop timer 992-9 and increase an aggregate size 992-10. In the embodiment shown, increasing an aggregation size can be an incremental process, increasing an aggregation size from its current value to a next higher value. However, in other embodiments, the amount by which an aggregation size limit is increased can vary according to the medium conditions. In some embodiments, increasing aggregate size 992-10 can include a device transmitting a control packet that indicates the larger aggregate packet size. A method can then return to the watchdog logic 992-0.

In this way, while circuits loop through checking a medium availability, aggregate packet size can be increased or decreased based on a packet receive rate.

Figure 10:
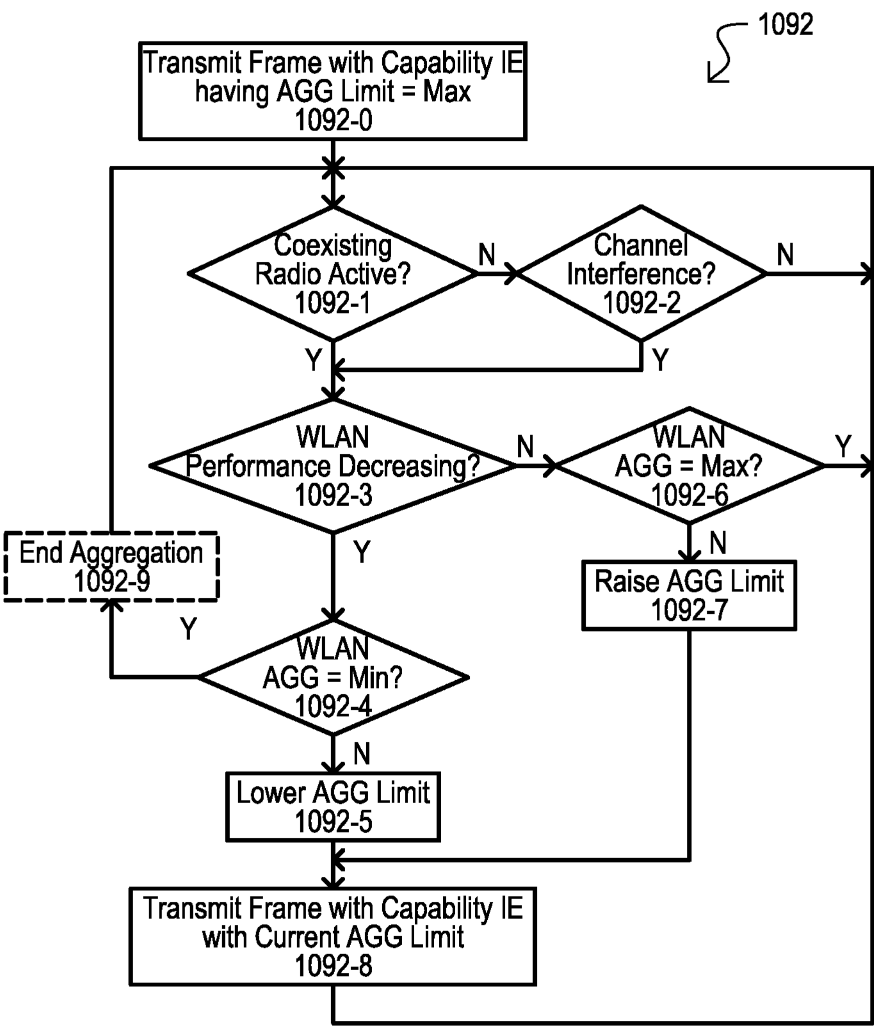
FIG. 10 is a flow diagram of a method according to a further embodiment.

FIG. 10 is a flow diagram of a method 1092 according to a further embodiment. In some embodiments, a method 1092 can be executed by a combination STA device having WLAN circuits and well as other radio circuits that share a medium with the WLAN circuits. A method 1092 can include transmitting a frame with a capability IE having an AGG limit set to a maximum value 1092-0. Such a maximum AGG value can vary according to particular standard and/or system configuration.

A method 1092 can determine if a coexisting radio is active 1092-1. Such an action can include, but is not limited to, receiving a signal for coexisting radio circuits of the same device, calculating a time the coexisting from a known schedule (e.g., TDM slot), or monitoring the medium for activity. Determining coexisting radio activity 1092-1 can also include determining comparative modes of operation between the WLAN radio and coexisting radio. For example, the presence of coexisting radio activity can be based on how much coexisting radio channel(s) overlap with a current WLAN channel.

If a coexisting radio is not active (N from 1092-1), a method 1092 can determine if there is interference on a channel 1092-2. Such an action can include monitoring transmission performance, or other channels known to generate interference (e.g., adjacent channels, channels generating interfering harmonics, etc.). If there is no channel interference (N from 1092-2), a method can return to checking for coexisting radio activity (1092-1).

If a coexisting radio is active (Y from 1092-1) or there is channel interference (Y from 1092-2), WLAN performance can be evaluated 1092-3. If performance is not decreasing (N from 1092-3), a method can determine if an AGG value is at a maximum size 1092-6. If a maximum size has been reached (Y from 1092-6), a method can return to checking for coexisting radio activity (return to 1092-1). If a maximum size has not been reached (N from 1092-6), a method can raise the AGG limit 1092-7. Such an action can include any of those described herein, or equivalents.

If WLAN performance is decreasing (Y from 1092-3), a method can determine if an AGG value is at a minimum size 1092-4. If an AGG value is at a minimum (Y from 1092-4), a method can return to checking for coexisting radio activity (1092-1). Optionally, aggregation of packets can be ended 1092-9 (i.e., only non-aggregate packets are to be received). If an AGG value is not at a minimum size (N from 1092-4), a method can lower an AGG limit 1092-5. Such an action can include any of those described herein, or equivalents.

A method can include transmitting a frame with a capability IE having a current AGG limit 1092-8. Such an action can include any suitable packet with the frame, including but not limited to, a probe request, association request, or reassociation request.

In this way, a WLAN system can increase or decrease a packet aggregation size limit in response to coexisting radio activity and/or channel interference.

Figure 11:
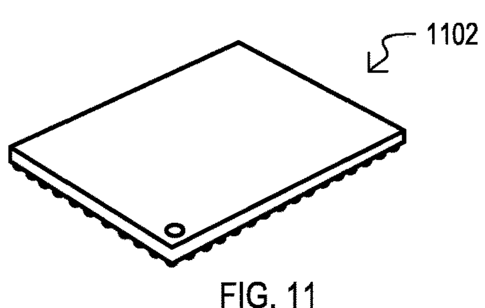
FIG. 11 is a diagram of an integrated circuit device according to an embodiment.

While embodiments can include systems and devices with various interconnected components, embodiments can also include unitary devices having WLAN circuits and coexisting (coex) radio circuits with low passive isolation. In some embodiments, such unitary devices can be advantageously compact single integrated circuits (i.e., chips). FIG. 11 show one example of a packaged single chip wireless device 1102 according to an embodiment. Such a device 1102 can include one or more coex circuits (e.g., BT, IEEE 802.15.4, Thread) and WLAN circuits that can dynamically vary WLAN aggregate packet size in response to coex circuit activity and/or medium status. In some embodiments, a device 1102 can include circuits like those shown in any of FIG. 1A or 2.

However, it is understood that a device according to embodiments can include any other suitable integrated circuit packaging type, as well as direct bonding of a device chip onto a circuit board or substrate.

Figure 12:
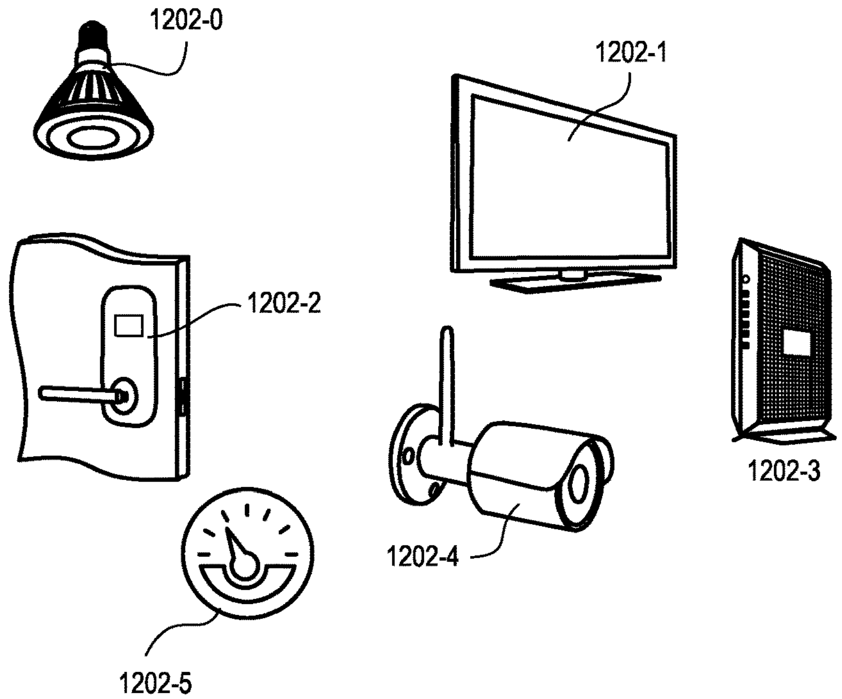
FIG. 12 is a diagram showing various systems according to embodiments.

While embodiments can include single integrated circuit devices, embodiments can include larger devices which improve the performance of coexisting radio circuits that use packet aggregation and share a same medium. FIG. 12 shows various systems according to embodiments. Such systems can include WLAN circuits capable of dynamically altering aggregate packet size, as well as one or more coex circuits. Systems can include Internet-of-things (IoT) type devices, that are wireless capable, including but not limited to: lighting devices 1202-0, entertainment devices 1202-1, physical security devices 1202-2, wireless devices, such as gateways or routers 1202-3, security monitoring devices 1202-4, or industrial instrumentation devices 1202-5. In such embodiments, packet aggregation can be improved as described herein or equivalents.

In this way, embodiments can include IoT type devices.

Figure 13:
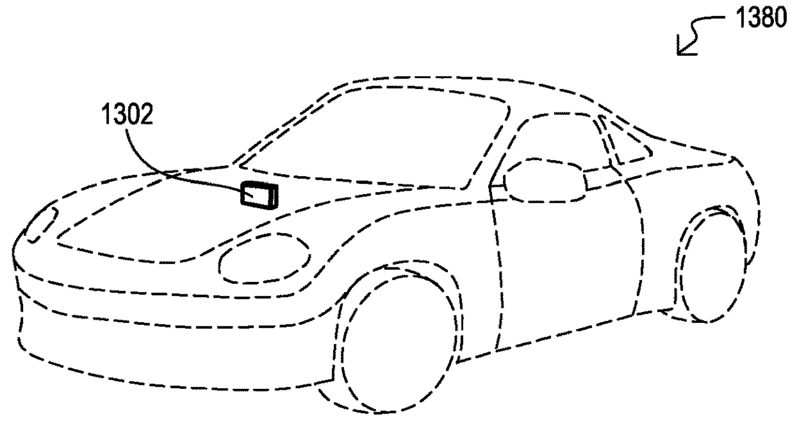
FIG. 13 is a diagram of a vehicle system according to an embodiment.

Embodiments can enjoy application in subsystems of motor vehicles to enable multiple, coexisting protocols to use a same medium more efficiently. FIG. 13 shows a motor vehicle system 1380 according to another embodiment. A motor vehicle system 1380 can include various subsystems, including but not limited to an infotainment subsystem 1302. A subsystem 1302 can include first communication circuits (e.g., WLAN circuits) and one or more other coex circuits. The first communication circuits can dynamically change aggregate packet size as described herein or equivalents.

In this way, vehicles can include combination devices with communication circuits that share a medium, and can execute dynamic packet aggregation size changes as described herein and equivalents.

Figure 14A:
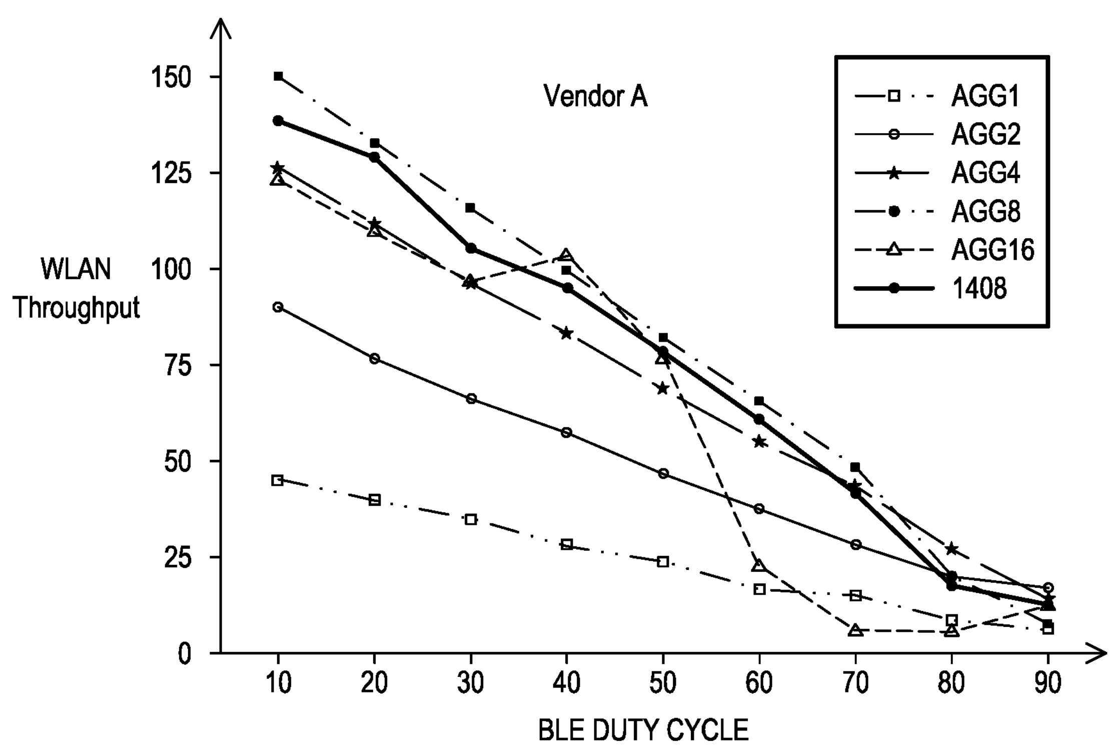
FIGS. 14A to 14C are graphs of experimental results comparing fixed packet aggregation sizes to dynamic packet aggregation according to an embodiment.
Figure 14B:
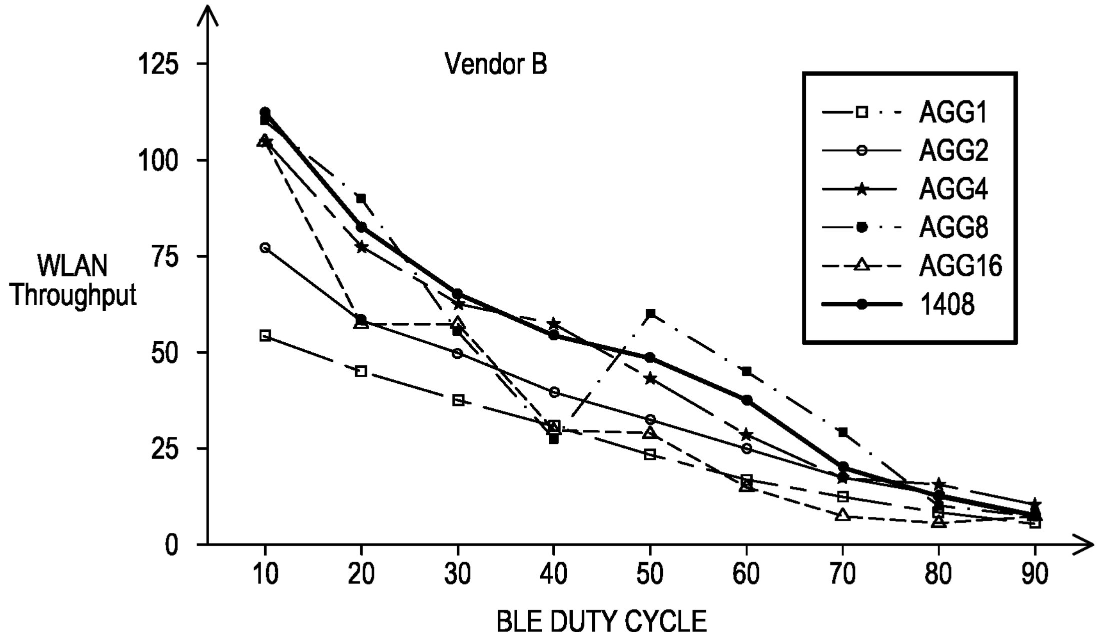
Figure 14C:
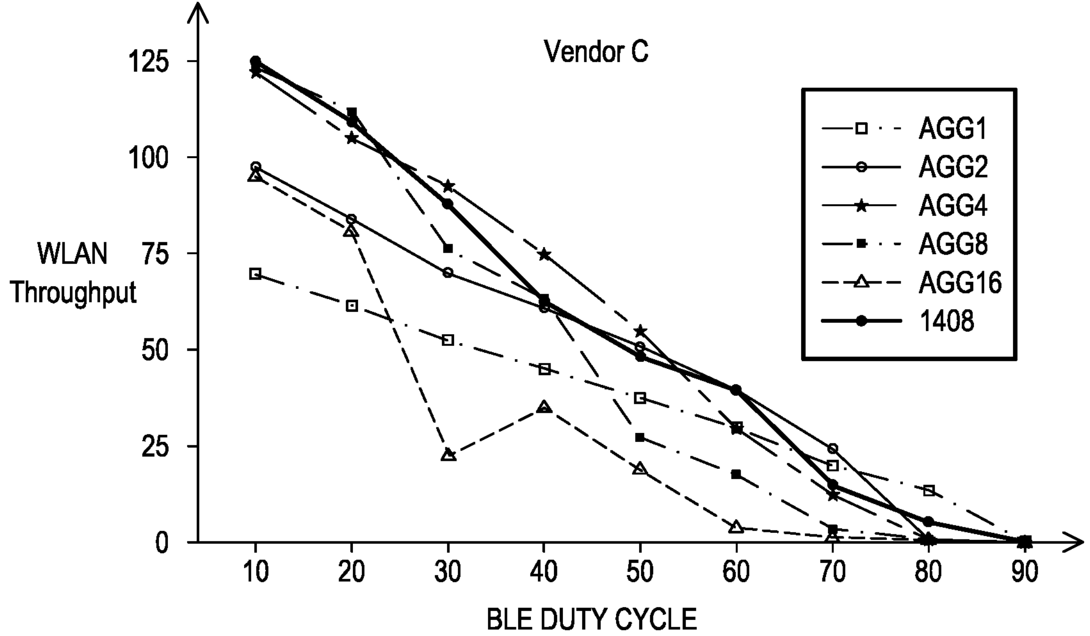

FIGS. 14A to 14C are experimental results showing the advantages of dynamically controlling packet aggregation size, as compared to various systems with fixed aggregation sizes. FIGS. 14A to 14C are graphs showing WLAN throughput versus a BLE duty cycle. WLAN throughput is rate at which WLAN packets are received. BLE duty cycle can be the percentage of a duty cycle taken by BT circuits as compared to WLAN circuits.

FIGS. 14A to 14C show systems with an AP device for different vendors (Vendor A, Vendor B, Vendor C) but a same STA combination device having WLAN circuits and coex BT circuits.

FIGS. 14A to 14C show the performance for fixed maximum packet aggregation sizes (AGG) of 1, 2, 4, 8 and 16, which can correspond to an aggregation length exponent value. In addition, FIGS. 14A to 14C show the performance of dynamically changing an AGG value 1408 as described herein.

As understood from the results, embodiments of the invention follow a highest performing aggregation value, regardless of vendor. This can enable wireless devices to provide optimal performance, regardless of which manufacturer devices are in the wireless system.

Embodiments can include methods, devices and systems that can, by operation of first wireless circuits of a device, establish a maximize size for aggregated packets received on a wireless medium. In response to second wireless circuits of the device using the medium, a received packet rate can be determined. In response to the received packet rate falling below a limit, the maximum size for aggregated packets received on the medium can be reduced. In response to at least the medium not being used by the second wireless circuits, increasing the maximum size for aggregated packets received on the medium. The first wireless circuits can operate according to at least a first standard and the second wireless circuits operate according to at least a second standard that is different than the first standard.

Methods, devices and systems according to embodiments can include a first standard being an IEEE 802.11 wireless standard.

Methods, devices and systems according to embodiments can include the medium comprising at least part of the 2.4 GHz ISM band.

Methods, devices and systems according to embodiments can include, reducing the maximum size for aggregated packets by transmitting a packet with the first wireless circuits that includes a maximum packet aggregation limit.

Methods, devices and systems according to embodiments can include a first standard being an IEEE 802.11 wireless standard. A maximum aggregation value can include a length exponent value included in an information element in a transmitted packet.

Methods, devices and systems according to embodiments can include determining if a medium is used by the second wireless circuits by receiving a signal transmitted from the second wireless circuits of a same integrated circuit device.

Methods, devices and systems according to embodiments can include monitoring a medium for interference. In response to detecting interference, determining if a received packet rate falls below a limit.

Embodiments can include methods, devices and systems that can include first wireless circuits configured to transmit and receive packets over at least a first medium according to at least a first standard, including aggregated packets having a maximum size. Second wireless circuits can be configured to transmit and receive data over the first medium according to at least a second standard. The first wireless circuits can include controller circuits configured to transmit a packet with information indicating a reduction in the maximum size for received aggregated packets in response to the second wireless circuits operating on the medium and a reduction in a packet reception rate, and transmit a packet with information indicating an increase in the maximum size for received aggregated packets in response to at least the second wireless circuits not operating on the medium.

Methods, devices and systems according to embodiments can include first wireless circuits configured to operate as a station device, and transmit a control packet having an information element with an aggregation length exponent value.

Methods, devices and systems according to embodiments can include first and second wireless circuits are formed with a same integrated circuit substrate.

Methods, devices and systems according to embodiments can include memory circuits configured to store the information indicating the increase in maximum size for received aggregated packets.

Embodiments can include methods, devices and systems having a first device that includes second wireless circuits configured to operate on a wireless medium according to a second standard and first wireless circuits configured to operate on the wireless medium according to a first standard, including receiving aggregate packets having a first aggregate limit. First wireless circuits can generate an outgoing packet with a second aggregate limit lower than the first aggregate limit in response to at least the first wireless circuits using the medium, and generate an outgoing packet with a third aggregate limit higher than the second aggregate limit in response to at least the first wireless circuits ceasing to use the medium. An antenna system can be coupled to the first device and configured to transmit and receive wireless signals according to at least the first and second standards.

Methods, devices and systems according to embodiments can include first wireless circuits configured to generate the outgoing packet with a second aggregate limit in response to at least the first wireless circuits using the medium and a received packet rate falling below a predetermined limit.

Methods, devices and systems according to embodiments can include first wireless circuits periodically monitoring for use of a medium by first wireless circuits.

Methods, devices and systems according to embodiments can include a second device configured to receive outgoing packets from the first device having an aggregate limit, and transmit aggregated packets to a first device having the aggregate limit.

Methods, devices and systems according to embodiments can include a first device comprises a station device that operates on the wireless medium according to at least one IEEE 802.11 wireless standard. A second device can comprise an access point that operates on the wireless medium according to the at least one IEEE 802.11 wireless standard. At least the second and third aggregate limits can be different size exponent values included in an information element of the corresponding outgoing packet.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

by operation of first wireless circuits of a device, establishing a maximum size for aggregated packets received on a wireless medium, the first wireless circuits having an activity time period on the medium t1;

in response to second wireless circuits of the device using the medium, determining a received packet rate;

in response to the received packet rate falling below a limit, reducing the maximum size for aggregated packets received on the medium while t1 remains unchanged; and in response to at least the medium not being used by the second wireless circuits, increasing the maximum size for aggregated packets received on the medium; wherein the first wireless circuits operate according to at least a first standard and the second wireless circuits operate according to at least a second standard that is different than the first standard.

2. The method of claim 1, wherein the first standard includes at least one IEEE 802.11 wireless standard.

3. The method of claim 1, wherein the medium comprises at least part of the 2.4 GHz ISM band.

4. The method of claim 1, wherein reducing the maximum size for aggregated packets includes transmitting a packet with the first wireless circuits that includes a maximum packet aggregation limit.

5. The method of claim 4, wherein:

the first standard is an IEEE 802.11 wireless standard; and the maximum aggregation value includes a length exponent value included in an information element in the transmitted packet.

6. The method of claim 1, wherein determining if the medium is used by the second wireless circuits includes receiving a signal transmitted from the second wireless circuits of a same integrated circuit device.

7. The method of claim 1, further including:
monitoring the medium for interference; and
in response to detecting interference, determining if the received packet rate falls below the limit.

8. A device, comprising:
first wireless circuits configured to transmit and receive packets over at least a first medium according to at least a first standard, including aggregated packets having a maximum size, the first wireless circuits having an activity time period on the first medium t1;
second wireless circuits configured to transmit and receive data over the first medium according to at least a second standard;
the first wireless circuits including controller circuits configured to
transmit a packet with information indicating a reduction in the maximum size for received aggregated packets in response to the second wireless circuits operating on the medium and a reduction in a packet reception rate while t1 remains unchanged, and
transmit a packet with information indicating an increase in the maximum size for received aggregated packets in response to at least the second wireless circuits not operating on the medium.

9. The device of claim 8, wherein the first standard is an IEEE 802.11 wireless standard.

10. The device of claim 9, wherein:
the first wireless circuits are configured to
operate as a station device, and
transmit a control packet having an information element with an aggregation length exponent value.

11. The device of claim 8, wherein the second standard is selected from the group of: a Bluetooth standard, including BLE, and an IEEE 802.15.4 based standard.

12. The device of claim 8, wherein the first and second wireless circuits are formed with a same integrated circuit substrate.

13. The device of claim 8, further including memory circuits configured to store the information indicating the increase in maximum size for received aggregated packets.

14. A system, comprising:
a first device that includes
second wireless circuits configured to operate on a wireless medium according to a second standard and
first wireless circuits having an activity time period on the medium t1, and configured to
operate on the wireless medium according to a first standard, including receiving aggregate packets having a first aggregate limit,
generate an outgoing packet with a second aggregate limit lower than the first aggregate limit in response to at least the first wireless circuits using the medium while t1 remains unchanged, and
generate an outgoing packet with a third aggregate limit higher than the second aggregate limit in response to at least the first wireless circuits ceasing to use the medium; and
an antenna system coupled to the first device configured to transmit and receive wireless signals according to at least the first and second standards.

15. The system of claim 14, wherein the first wireless circuits are configured to generate the outgoing packet with the second aggregate limit in response to at least the first wireless circuits using the medium and a received packet rate falling below a predetermined limit.

16. The system of claim 14, wherein the first wireless circuits are configured to periodically monitor for use of the medium by the first wireless circuits.

17. The system of claim 14, wherein the first standard includes at least one IEEE 802.11 wireless standard.

18. The system of claim 14, wherein the second standard is selected from the group of: a Bluetooth standard, including BLE, and an IEEE 802.15.4 based standard.

19. The system of claim 14, further including:
a second device configured to
receive outgoing packets from the first device having an aggregate limit, and
transmit aggregated packets to the first device having the aggregate limit.

20. The system of claim 19, wherein:
the first device comprises a station device that operates on the wireless medium according to at least one IEEE 802.11 wireless standard;
the second device comprises an access point that operates on the wireless medium according to the at least one IEEE 802.11 wireless standard; and
at least the second and third aggregate limits are different size exponent values included in an information element of the corresponding outgoing packet.

* * * * *